(12) United States Patent
Geckeler et al.

(10) Patent No.: US 8,468,886 B2
(45) Date of Patent: Jun. 25, 2013

(54) YAW RATE SENSOR AND METHOD FOR OPERATING A YAW RATE SENSOR

(75) Inventors: Carsten Geckeler, Tuebingen (DE); Udo-Martin Gomez, Leonberg (DE); Thorsten Balslink, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 12/924,772

(22) Filed: Oct. 5, 2010

(65) Prior Publication Data

US 2011/0083507 A1 Apr. 14, 2011

(30) Foreign Application Priority Data

Oct. 7, 2009 (DE) .......................... 10 2009 045 432

(51) Int. Cl.
*G01C 19/56* (2012.01)

(52) U.S. Cl.
USPC ..................................... 73/504.12; 73/504.04

(58) Field of Classification Search
USPC ............... 73/504.12, 504.14, 504.04, 504.02, 73/504.16
See application file for complete search history.

(56) References Cited

U.S. PATENT DOCUMENTS

| 7,043,985 | B2 * | 5/2006 | Ayazi et al. | 73/504.04 |
| 8,061,201 | B2 * | 11/2011 | Ayazi et al. | 73/504.12 |
| 2007/0234803 | A1 * | 10/2007 | Gomez et al. | 73/504.12 |
| 2010/0132461 | A1 * | 6/2010 | Hauer et al. | 73/504.12 |
| 2011/0041603 | A1 * | 2/2011 | Pruetz | 73/504.12 |
| 2012/0125099 | A1 * | 5/2012 | Scheben et al. | 73/504.12 |

FOREIGN PATENT DOCUMENTS

WO     WO 03/058167     7/2003

* cited by examiner

*Primary Examiner* — Helen Kwok
(74) *Attorney, Agent, or Firm* — Kenyon & Kenyon LLP

(57) ABSTRACT

A yaw rate sensor includes a substrate which has a main plane of extension and a Coriolis element which is movable relative to the substrate. The yaw rate sensor has an excitation arrangement for exciting a drive oscillation of the Coriolis element along a first direction parallel to the main plane of extension. The yaw rate sensor has a detection arrangement for detecting a Coriolis deflection of the Coriolis element along a third direction which is perpendicular to the main plane of extension. In addition, the yaw rate sensor has a quadrature compensation structure which includes a comb electrode structure and a plate capacitor structure.

9 Claims, 3 Drawing Sheets

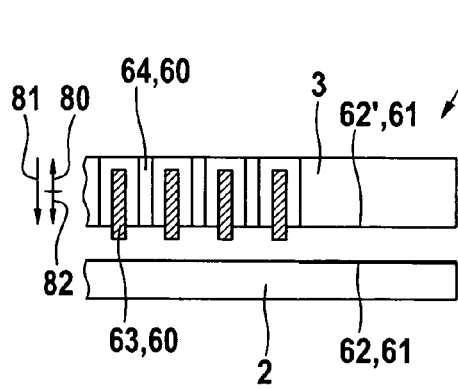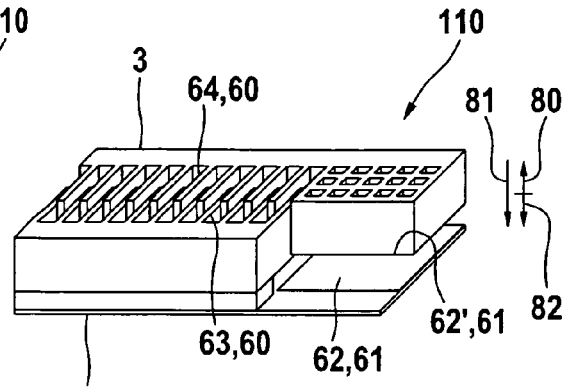
FIG. 4A | FIG. 4B
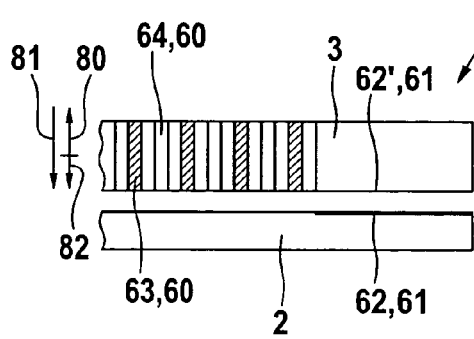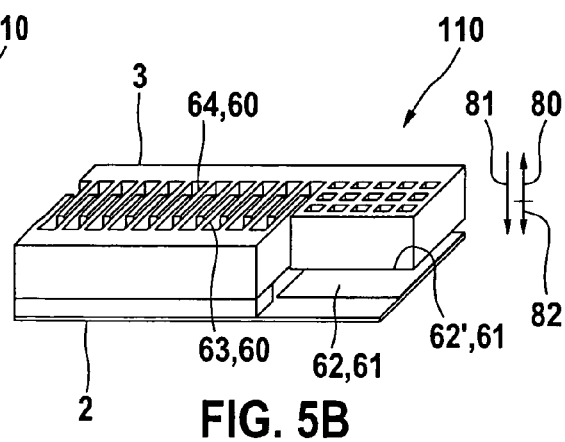
FIG. 5A | FIG. 5B
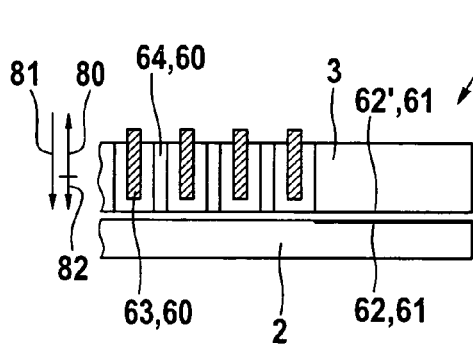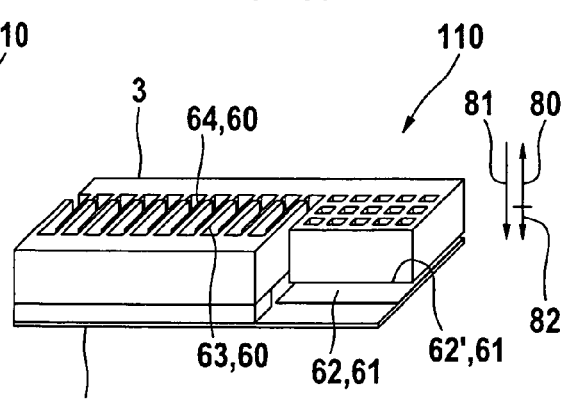
FIG. 6A | FIG. 6B

YAW RATE SENSOR AND METHOD FOR OPERATING A YAW RATE SENSOR

BACKGROUND OF THE INVENTION

1. Field of the Invention

The present invention is directed to a yaw rate sensor and a method for operating a yaw rate sensor.

2. Description of Related Art

Such sensors and methods are known, e.g., a yaw rate sensor having a substrate and a Coriolis element is known from published international patent application WO 03/058167 A1, in which the Coriolis element can be excited to a drive oscillation parallel to a first axis, and the Coriolis element is deflected by a Coriolis force along a detection direction perpendicular to the first axis, and the yaw rate sensor has force-transmitting means between the substrate and the Coriolis element in the form of compensation structures provided for compensating for quadrature bias. The Coriolis element includes a seismic mass having multiple cutouts into which electrodes of the compensation structures protrude, which are connected to the substrate. The inner circumference of each of the cutouts has an asymmetrical design, so that quadrature compensation forces are generated parallel to the detection direction as the result of appropriate wiring of the electrodes. These quadrature compensation forces are used to compensate for the quadrature bias which is superimposed on the detection motion of the Coriolis element and which occurs during the excitation of the drive oscillation due to manufacturing-related imperfections in the sensor structure. It is disadvantageous that the quadrature compensation forces are greatly dependent on the deflection along the detection direction, so that an inadvertent oscillation of the Coriolis element about its working point along the detection direction results in a change in the quadrature compensation force. As a result, the vibration sensitivity of the sensor system with respect to external interfering excitations is increased. The quadrature compensation forces, which are a function of the working point, also result in a working point-dependent electrostatic spring stiffness along the detection direction, so that the resonance frequency of the sensor system also has an undesired dependency on the working point.

BRIEF SUMMARY OF THE INVENTION

The yaw rate sensor according to the present invention and the method according to the present invention for operating a yaw rate sensor have the advantage over the related art that the quadrature compensation structure generates a quadrature compensation force on the Coriolis element which on the one hand compensates for the undesired quadrature bias, and on the other hand has little or no working point dependency along the third direction (i.e., in the direction of force or in the direction of detection). The vibration sensitivity of the yaw rate sensor is thus advantageously greatly increased compared to the related art. In addition, there is little or no influence by the quadrature compensation on the resonance frequency of the yaw rate sensor along the third direction. These advantages are achieved by the quadrature compensation having a comb electrode structure as well as a plate capacitor structure.

The comb electrode structure generates a first compensating force, and the plate capacitor structure generates a second compensating force, in each case on the Coriolis element along the third direction (also referred to below as the "detection direction"), the quadrature compensation force essentially being the sum of the first compensating force and the second compensating force. The first and the second compensating forces are each a function, on the one hand, of the position of the Coriolis element along the first direction (also referred to below as the "drive direction"), and on the other hand, of the position of the Coriolis element along the detection direction (working point dependency). Due to the physical characteristics of a comb electrode structure, the change in the first compensating force is negative with increasing deflection of the Coriolis element along the detection direction (directed away from the substrate), while due to the physical characteristics of a plate capacitor structure the change in the second compensating force is positive with increasing deflection of the Coriolis element along the detection direction (directed away from the substrate); see, for example, FIG. 3. The change in the first compensating force advantageously compensates, at least partially, for the change in the second compensating force, and/or the change in the second compensating force compensates, at least partially, for the change in the first compensating force, so that overall, a quadrature compensation force is generated which has little or no dependency on the deflection of the Coriolis element along the detection direction, and thus on the working point of the Coriolis element along the detection direction. The yaw rate sensor preferably includes a micromechanical yaw rate sensor which is provided for measuring yaw rates "in-plane" (the rotational axis of the yaw rate is parallel to a main plane of extension of the substrate) and/or "out-of-plane" (the rotational axis of the yaw rate is perpendicular to the main plane of extension). The substrate includes in particular a semiconductor substrate such as silicon, for example.

According to one example embodiment, it is provided that the plate capacitor structure includes a flat electrode which is essentially parallel to a main plane of extension of the substrate, and which is mounted on the substrate and is situated perpendicular to the third direction, preferably at least partially between the Coriolis element and the substrate. The flat electrode is advantageously suited for generating a second compensating force on the Coriolis element, perpendicular to the main plane of extension in the direction of the substrate and in particular parallel to the third direction, based on electrostatic interaction. The absolute value of the second compensating force increases with increasing negative deflection of the Coriolis element from the starting position, in the direction of the substrate along third direction Z.

According to one example embodiment, it is provided that the comb electrode structure includes first finger electrodes, and second finger electrodes which engage with the first finger electrodes, parallel to the first direction, the first finger electrodes preferably being mounted on the substrate and the second finger electrodes preferably being mounted on the Coriolis element. The comb structure is advantageously suited for generating a first compensating force on the Coriolis element, perpendicular to the main plane of extension in the direction of the substrate, and in particular along the third direction. This first compensating force is usually referred to as a "levitation force," and is generated by an asymmetrical field distribution above and below the finger electrodes. The space on the side of the first and second finger electrodes facing away from the substrate is not delimited by the substrate, so that the stray fields extend farther on this side. The first compensating force is thus the resultant force, which is directed parallel to the third direction, away from the substrate. The first and the second compensating forces are thus diametrically opposed, and therefore partially compensate for one another. However, the absolute values of the first and the second compensating forces are different, so that a resultant quadrature compensation force is still generated in the direction of the substrate. The second compensating force decreases with increasing negative deflection of the Coriolis element from the starting position, in the direction of the substrate along third direction Z. Since the algebraic signs of the first and second compensating forces are opposite, the change in the first compensating force and the change in the second compensating force are also opposite one another as a function of the deflection along the third direction, so that the total of these changes may be at least partially mutually compensated for. A quadrature compensation force is thus advantageously generated which has little or no dependency on the deflection of the Coriolis element along the third direction.

According to one example embodiment, it is provided that the first finger electrodes are connected to the flat electrode in an electrically conductive manner. The electrical contacting as well as the control of the quadrature compensation structure are thus advantageously greatly simplified. The ratio of the first compensating force to the second compensating force is preferably set via the design of the plate capacitor structure relative to the comb electrode structure.

According to one example embodiment, it is provided that the yaw rate sensor has a further quadrature compensation structure which includes a further comb electrode structure and a further plate capacitor structure, the further plate capacitor structure preferably including a further flat electrode which is essentially parallel to the main plane of extension, and the further comb electrode structure preferably having further first finger electrodes mounted on the substrate, and having further second finger electrodes mounted on the Coriolis element and engaging with the further first finger electrodes, parallel to the first direction. Force components [acting] perpendicularly to the third direction are advantageously compensated for by the quadrature compensation structure.

According to one example embodiment, it is provided that the quadrature compensation structure and the further quadrature compensation structure have a mirror-symmetrical design with respect to a mirror plane which is perpendicular to both the main plane of extension and the first direction, so that forces on the comb electrode structure along the first direction may be compensated for by the further comb electrode structure in such a way that no resultant force components are generated on the Coriolis element along the first direction. Thus, the drive oscillation is advantageously not influenced by the quadrature compensation structures.

According to one example embodiment, it is provided that the Coriolis element has a recess, perpendicular to the main plane of extension, in which the comb electrode structure and/or the further comb electrode structure is/are situated. Thus, it is particularly advantageous that on the one hand a comparatively compact configuration of the yaw rate sensor is made possible, and on the other hand the excitation means are situated in a known manner on the outer sides of the Coriolis element.

According to one example embodiment, it is provided that the quadrature compensation structure and the further quadrature compensation structure are designed in such a way that the quadrature compensation force is a function of the drive oscillation, and/or that the quadrature compensation force is essentially independent of the Coriolis deflection. By suitably dimensioning the plate capacitor structure and the comb electrode structure, a quadrature compensation force is advantageously achieved which at the working point is a function only of a drive-related deflection of the Coriolis element along the first direction (drive direction), and has little or no dependency on the deflection of the Coriolis element along the third direction (detection direction).

A further object of the present invention is to provide a method for operating a yaw rate sensor, the drive oscillation of the Coriolis element being excited along the first direction in a first operating step, and a quadrature compensation force on the Coriolis element along the third direction being generated by the quadrature compensation structure in a second operating step in such a way that a change in a first compensating force generated by the comb electrode structure as a function of the Coriolis deflection is at least partially compensated for by a change in a second compensating force generated by the plate capacitor structure as a function of the Coriolis deflection. Thus, as already described in detail above, a quadrature compensation force is advantageously generated which at the working point has little or no dependency on the deflection of the Coriolis element along the third direction. The vibration sensitivity is thus advantageously reduced in comparison to the related art. The quadrature compensation force plotted versus the Coriolis deflection preferably has a maximum at the working point, i.e., in the starting position, thus greatly reducing the vibration sensitivity at the working point.

According to one example embodiment, it is provided that the quadrature compensation force on the Coriolis element is generated in such a way that the quadrature compensation force is a function of the drive oscillation, and/or that the quadrature compensation force is essentially independent of the Coriolis deflection.

BRIEF DESCRIPTION OF THE DRAWINGS

FIGS. 4a, 4b, 5a, 5b, 6a, and 6b show schematic views of various compensating forces of a yaw rate sensor according to the first example embodiment of the present invention.

DETAILED DESCRIPTION OF THE INVENTION

Figure 1:
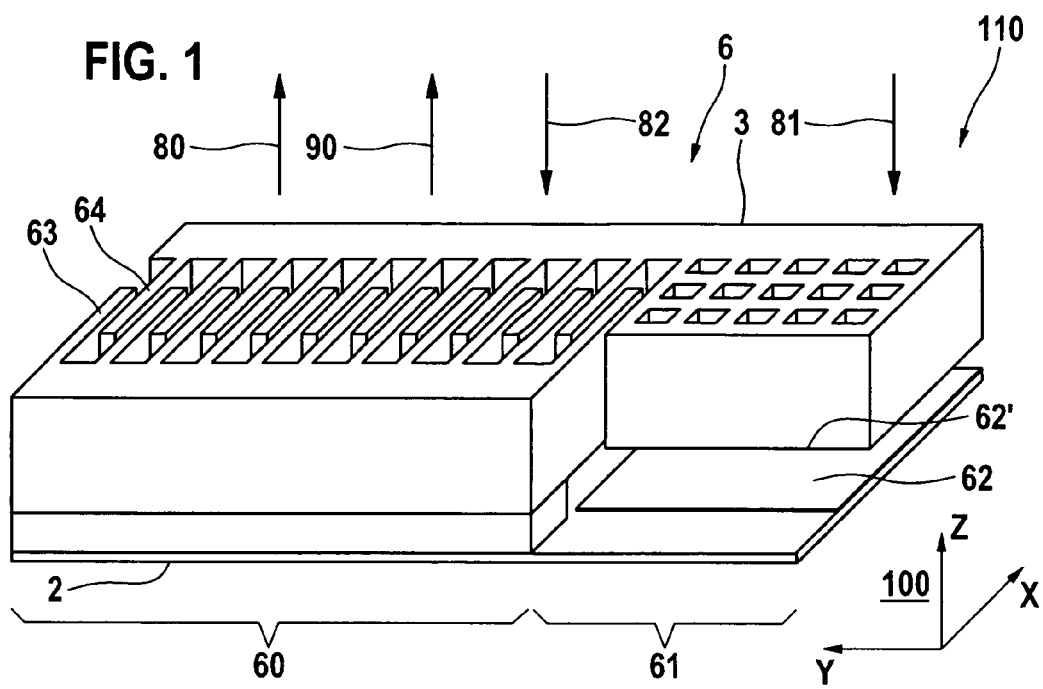
FIG. 1 shows a schematic perspective view of a quadrature compensation structure of a yaw rate sensor according to a first example embodiment of the present invention.

FIG. 1 illustrates a schematic perspective view of a quadrature compensation structure of a yaw rate sensor 1 according to a first example embodiment of the present invention, yaw rate sensor 1 having a substrate 2 which has a main plane of extension 100 and a Coriolis element 3 which is movable relative to the substrate. Coriolis element 3 is excited to a drive oscillation, relative to substrate 2, along a first direction X parallel to main plane of extension 100 with the aid of excitation means (not illustrated). When a yaw rate is present about a rotational axis which is parallel to a second direction Y, parallel to the main plane of extension 100, and perpendicular to a first direction X, Coriolis element 3 experiences a Coriolis force parallel to a third direction Z perpendicular to main plane of extension 100, which causes a Coriolis deflection of Coriolis element 3 along third direction Z which may be detected by detection means (not illustrated). Coriolis element 3 is illustrated in its starting position 110 (also referred to as "equilibrium position") in FIG. 1. The Coriolis deflection, not illustrated, includes a positive deflection of Coriolis element 3 from starting position 110 which is directed away from substrate 2, or a negative deflection of the Coriolis element from starting position 110 which is directed toward substrate 2. The Coriolis deflection is superimposed by a quadrature bias 90 along third direction Z which results from manufacturing-related imperfections in yaw rate sensor 1.

Yaw rate sensor 1 has a quadrature compensation structure 6 for compensating for this quadrature bias 90. Quadrature compensation structure 6 includes a comb electrode structure 60 which extends parallel to first direction X and includes first and second finger electrodes 63, 64. First finger electrodes 63 are anchored to substrate 2, and second finger electrodes 64 are anchored to Coriolis element 3. First finger electrodes 63 also engage between second finger electrodes 64 along first direction X in such a way that first and second finger electrodes 63, 64 partially overlap one another along second direction Y. A difference in potential between first and second finger electrodes 63, 64 causes a first compensating force 80, also referred to as a levitation force, which is directed away from substrate 2 to act on Coriolis element 3 along third direction Z. The first compensating force is superimposed on quadrature bias 90, and increases with an increasing positive Coriolis deflection. Quadrature compensation structure 6 also includes a plate capacitor structure 61 which has a flat electrode 62 which is situated along third direction Z between substrate 2 and Coriolis element 3 and is fixedly connected to substrate 2. A difference in potential between flat electrode 62 and a partial region of Coriolis element 3 which functions as a counterelectrode 62' generates a second compensating force 81 which is directed toward substrate 2, parallel to first compensating force 80 and parallel to third direction Z. Second compensating force 81 is opposite to quadrature bias 90, and overcompensates quadrature bias 90. Similarly as for first compensating force 80, second compensating force 81 also decreases with increasing Coriolis deflection directed away from substrate 2, but in the opposite direction from first compensating force 80. The sum of first and second compensating forces 80, 81 is referred to as quadrature compensation force 82.

Comb electrode structure 60 and plate capacitor structure 61 are now dimensioned in such a way that in the starting position (i.e., in the working point of Coriolis element 3), quadrature compensation force 82 compensates for quadrature bias 90

$$\left( \frac{\partial F_{x,total}}{\partial x} \bigg|_{z=z_{AP}} \neq 0 \right),$$

and at the same time is essentially independent of the Coriolis deflection $$\left( \frac{\partial}{\partial x} \frac{\partial F_{x,total}}{\partial x} \bigg|_{z=z_{AP}} = 0 \right).$$

Such a setting of quadrature compensation force 82 is achieved, for example, via the number and/or the width of first and second finger electrodes 63, 64, via the distance and/or the overlap area between first and second finger electrodes 63, 64, via the distance and/or the overlap area between counterelectrode 62' and flat electrode 62, and the like. Optionally, it is possible to control quadrature compensation force 82 via the voltage applied to first finger electrodes 63 and flat electrode 62, first finger electrodes 63 and flat electrode 62 being preferably wired together or separately.

Figure 2:
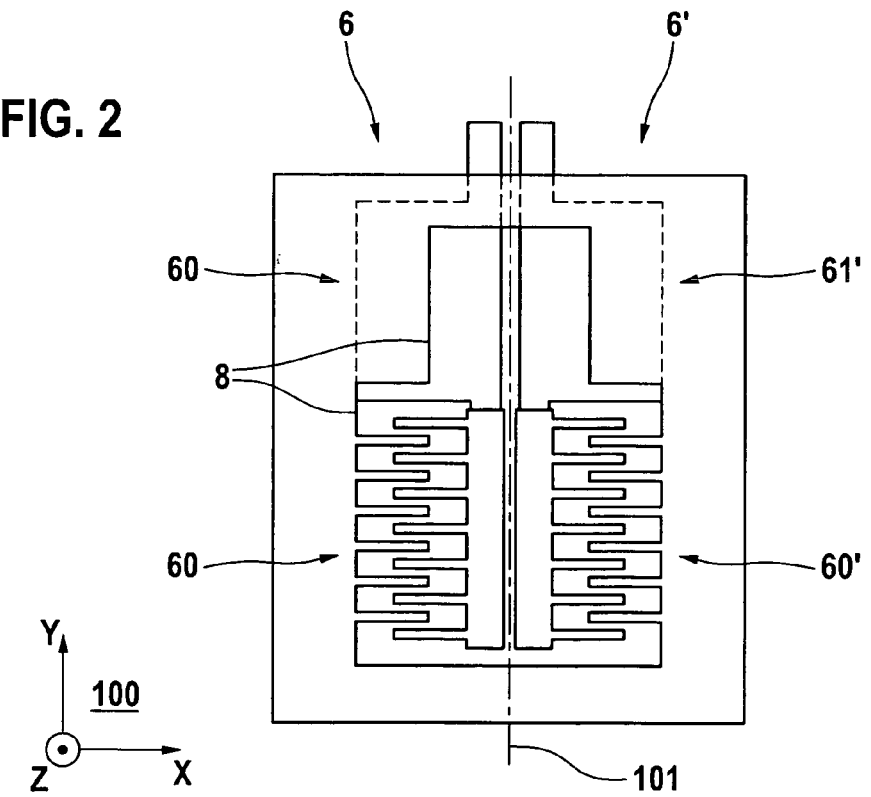
FIG. 2 shows a schematic top view of a partial region of a yaw rate sensor according to the first example embodiment of the present invention.

FIG. 2 illustrates a schematic top view of a partial region of a yaw rate sensor 1 according to the first example embodiment of the present invention, Coriolis element 3 having a recess 8 in which a quadrature compensation structure 6 illustrated in FIG. 1 and also a structurally identical further quadrature compensation structure 6' are situated. Further quadrature compensation structure 6' has a mirror-symmetrical design with respect to a mirror plane 101 which is perpendicular to main plane of extension 100 and to first direction X, and which passes through the center of recess 8, so that forces emanating from finger electrode structure 60 and a further finger electrode structure 60' of further quadrature compensation structure 6' mutually compensate for one another parallel to main plane of extension 100. Quadrature compensation structure 6 and further quadrature compensation structure 6' are preferably wired separately for compensation of manufacturing-related tolerances.

Figure 3:
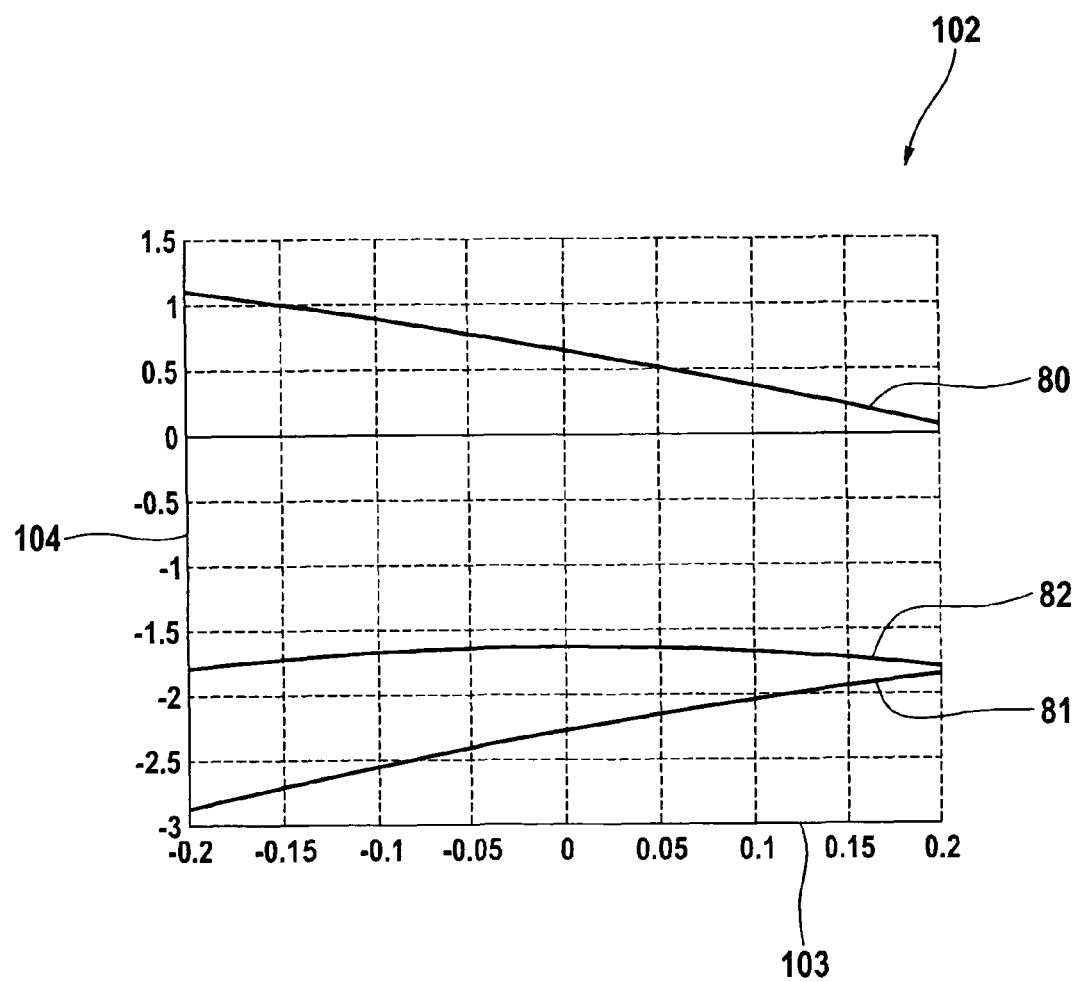
FIG. 3 shows a schematic variation over time of a quadrature compensation force of a yaw rate sensor according to the first example embodiment of the present invention.

FIG. 3 illustrates a schematic variation over time of a quadrature compensation force 90 of a yaw rate sensor 1 according to the first example embodiment of the present invention, FIG. 3 showing a diagram 102 in which the Coriolis deflection is plotted on abscissa 103, and a force which acts on Coriolis element 3 along third direction Z is plotted on the ordinate. Diagram 102 shows first compensating force 80, second compensating force 81, and quadrature compensation force 82, each as a function of the Coriolis deflection. It is seen that the slope of first compensating force 80 is negative with increasing Coriolis deflection, while the slope of second compensating force 81 is positive with increasing Coriolis deflection, so that overall, quadrature compensation force 82 as the sum of first and second compensating forces 80, 81 has a greatly reduced dependency on the Coriolis deflection.

FIGS. 4a, 4b, 5a, 5b, 6a, and 6b show schematic views of compensating forces 80, 81 of a yaw rate sensor 1 according to the first example embodiment of the present invention, each being illustrated for three different Coriolis deflections of Coriolis element 3. FIGS. 5a and 5b illustrate a sectional view and a perspective view of quadrature compensation structure 6 in the starting position of Coriolis element 3. In FIGS. 4a and 4b, Coriolis element 3 has a Coriolis deflection which is positive with respect to the starting position and is directed away from substrate 2, and in FIGS. 6a and 6b the Coriolis element has a Coriolis deflection which is negative with respect to the starting position and is directed toward substrate 2. It is seen that the absolute value of first compensating force 80 in FIGS. 4a and 4b (positive Coriolis deflection) is smaller, and in FIGS. 6a and 6b (negative Coriolis deflection) is larger, than in FIGS. 5a and 5b (starting position). Similarly, the absolute value of second compensating force 81 in FIGS. 4a and 4b is also smaller, and in FIGS. 6a and 6b is also larger, than in FIGS. 5a and 5b. In contrast, the sum of first and second compensating forces 80, 81 in the form of quadrature compensation force 82 is essentially equal in all of FIGS. 5a through 6b.

What is claimed is:

1. A yaw rate sensor, comprising:
    a substrate;
    a Coriolis element movable relative to the substrate;
    an excitation arrangement configured to excite a drive oscillation of the Coriolis element along a first direction;
    a detection arrangement configured to detect a Coriolis deflection of the Coriolis element along a second direction perpendicular to the first direction; and
    a quadrature compensation structure including a comb electrode structure and a plate capacitor structure;
    wherein the plate capacitor structure includes a flat electrode essentially parallel to a main plane of extension of the substrate, and wherein the flat electrode is mounted on the substrate and is situated perpendicular to the second direction and at least partially between the Coriolis element and the substrate.

2. The yaw rate sensor as recited in claim 1, wherein the comb electrode structure includes first finger electrodes and second finger electrodes engaged with the first finger electrodes, parallel to the first direction, and wherein the first finger electrodes are mounted on the substrate and the second finger electrodes are mounted on the Coriolis element.

3. The yaw rate sensor as recited in claim 2, wherein the first finger electrodes are connected to the flat electrode in an electrically conductive manner.

4. The yaw rate sensor as recited in claim 2, further comprising:
 a further quadrature compensation structure including a further comb electrode structure and a further plate capacitor structure, wherein the further plate capacitor structure includes a further flat electrode essentially parallel to the main plane of extension, and wherein the further comb electrode structure includes further first finger electrodes mounted on the substrate and further second finger electrodes mounted on the Coriolis element and engaged with the further first finger electrodes, parallel to the first direction.

5. The yaw rate sensor as recited in claim 4, wherein the quadrature compensation structure and the further quadrature compensation structure have a mirror-symmetrical configuration with respect to a mirror plane perpendicular to both the main plane of extension and the first direction.

6. The yaw rate sensor as recited in claim 4, wherein the Coriolis element has a recess perpendicular to the main plane of extension, and wherein at least one of the comb electrode structure and the further comb electrode structure is situated in the recess.

7. The yaw rate sensor as recited in claim 4, wherein the quadrature compensation structure and the further quadrature compensation structure are configured in such a way that at least one of: (i) a quadrature compensation force is a function of the drive oscillation, and (ii) the quadrature compensation force is essentially independent of the Coriolis deflection.

8. A method for operating a yaw rate sensor, comprising:
 exciting a drive oscillation of a Coriolis element of the sensor along a first direction; and
 generating a quadrature compensation force on the Coriolis element along a second direction by a quadrature compensation structure of the sensor in such a way that a change in a first compensating force generated by a comb electrode structure of the sensor as a function of a Coriolis deflection and a change in a second compensating force generated by a plate capacitor structure of the sensor as a function of the Coriolis deflection is at least partially mutually compensated;
 wherein the plate capacitor structure includes a flat electrode essentially parallel to a main plane of extension of the substrate, and wherein the flat electrode is mounted on the substrate and is situated perpendicular to the second direction and at least partially between the Coriolis element and the substrate.

9. The method as recited in claim 8, wherein the quadrature compensation force is generated in such a way that at least one of: (i) the quadrature compensation force is a function of the drive oscillation, and (ii) the quadrature compensation force is essentially independent of the Coriolis deflection.

* * * * *